(12) United States Patent
Oggianu et al.

(10) Patent No.: US 11,312,594 B2
(45) Date of Patent: Apr. 26, 2022

(54) CONVEYANCE SYSTEM VIDEO ANALYTICS

(71) Applicant: Otis Elevator Company, Farmington, CT (US)

(72) Inventors: Stella M. Oggianu, Farmington, CT (US); Ankit Anand Gupta, Mysore (IN); Frank Higgins, Burlington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 190 days.

(21) Appl. No.: 16/665,390

(22) Filed: Oct. 28, 2019

(65) Prior Publication Data

US 2020/0148505 A1    May 14, 2020

(30) Foreign Application Priority Data

Nov. 9, 2018  (IN) .............................. 201811042193

(51) Int. Cl.
| | |
|---|---|
| *H04N 7/18* | (2006.01) |
| *G06V 20/52* | (2022.01) |
| *B66B 5/00* | (2006.01) |
| *B66B 1/34* | (2006.01) |
| *B66B 13/22* | (2006.01) |
| *G06V 40/10* | (2022.01) |

(52) U.S. Cl.
CPC .......... *B66B 5/0025* (2013.01); *B66B 1/3461* (2013.01); *B66B 5/0012* (2013.01); *B66B 13/22* (2013.01); *G06V 20/52* (2022.01); *G06V 40/10* (2022.01); *H04N 7/18* (2013.01)

(58) Field of Classification Search
CPC ... B66B 5/0025; B66B 1/3461; B66B 5/0012; B66B 13/22; G06K 9/00362; G06K 9/00771; H04N 7/18
USPC ........................................................ 348/143
See application file for complete search history.

(56) References Cited

U.S. PATENT DOCUMENTS

| | | | |
|---|---|---|---|
| 6,678,413 | B1 | 1/2004 | Liang et al. |
| 6,856,249 | B2 | 2/2005 | Strubbe et al. |
| 6,863,161 | B2 | 3/2005 | Mearns et al. |
| 6,999,600 | B2 | 2/2006 | Venetianer et al. |
| 7,073,633 | B2 | 7/2006 | Weinberger et al. |

(Continued)

FOREIGN PATENT DOCUMENTS

| | | |
|---|---|---|
| CN | 101801831 A | 8/2010 |
| CN | 102030232 A | 4/2011 |

(Continued)

OTHER PUBLICATIONS

EP Application No. 19208180.0 Extended EP Search Report dated Mar. 31, 2020, 6 pages.

(Continued)

*Primary Examiner* — Jae N Noh
(74) *Attorney, Agent, or Firm* — Cantor Colburn LLP

(57) ABSTRACT

According to an aspect, a method includes capturing image data from a video camera at a conveyance system. Analytics of the image data can be initiated to determine a plurality of conditions of the conveyance system. A status of the conditions can be summarized as a metadata output. The metadata output can be transmitted to a support system operable to initiate a corrective action responsive to the status of the conditions.

20 Claims, 4 Drawing Sheets

(56) References Cited

U.S. PATENT DOCUMENTS

| | | |
|---|---|---|
| 7,110,569 B2 | 9/2006 | Brodsky et al. |
| 7,158,680 B2 | 1/2007 | Pace |
| 7,683,929 B2 | 3/2010 | Elazar et al. |
| 7,864,980 B2 | 1/2011 | Evans |
| 7,868,912 B2 | 1/2011 | Venetianer et al. |
| 8,358,342 B2 | 1/2013 | Park |
| 8,411,935 B2 | 4/2013 | Eaton et al. |
| 8,620,028 B2 | 12/2013 | Eaton et al. |
| 8,855,361 B2 | 10/2014 | Miller et al. |
| 9,158,974 B1 | 10/2015 | Laska et al. |
| 9,240,051 B2 | 1/2016 | Liu et al. |
| 9,996,749 B2 | 6/2018 | Bataller et al. |
| 2007/0151808 A1 | 7/2007 | Amano |
| 2008/0193010 A1 | 8/2008 | Eaton et al. |
| 2016/0289042 A1 | 10/2016 | Fang et al. |
| 2016/0295196 A1 | 10/2016 | Finn et al. |
| 2016/0311646 A1 | 10/2016 | Bryant et al. |
| 2018/0057307 A1 | 3/2018 | Halingale |
| 2020/0223659 A1* | 7/2020 | Hikichi ................ B66B 1/468 |

FOREIGN PATENT DOCUMENTS

| | | |
|---|---|---|
| CN | 101571914 B | 4/2012 |
| CN | 103038150 A | 4/2013 |
| CN | 104692204 A | 6/2015 |
| CN | 104891294 A | 9/2015 |
| CN | 103593532 B | 4/2016 |
| CN | 104039674 B | 4/2016 |
| CN | 105491352 A | 4/2016 |
| CN | 103183263 B | 5/2016 |
| CN | 106006266 A | 10/2016 |
| CN | 103577827 B | 12/2016 |
| CN | 106219343 A | 12/2016 |
| CN | 106241533 A | 12/2016 |
| CN | 106241534 A | 12/2016 |
| CN | 104787631 B | 1/2017 |
| CN | 106348114 A | 1/2017 |
| CN | 105035887 B | 6/2017 |
| CN | 106892310 A | 6/2017 |
| CN | 107010504 A | 8/2017 |
| CN | 107055230 A | 8/2017 |
| CN | 107074487 A | 8/2017 |
| CN | 107265232 A | 10/2017 |
| CN | 105480806 B | 12/2017 |
| CN | 107416632 A | 12/2017 |
| CN | 107777498 A | 3/2018 |
| CN | 107902513 A | 4/2018 |
| CN | 108483172 A | 9/2018 |
| CN | 108529377 A | 9/2018 |
| EP | 1345445 A1 | 9/2003 |
| EP | 2610203 A1 | 7/2013 |
| EP | 3299327 A1 | 3/2018 |
| EP | 3382614 A1 | 10/2018 |
| JP | 2004352452 A | 12/2004 |
| JP | 2007276941 A | 10/2007 |
| JP | 5976879 B1 | 8/2016 |
| JP | 106744115 A | 5/2017 |
| WO | 0142120 A1 | 6/2001 |

OTHER PUBLICATIONS

Chen et al. "Intelligent Video Monitoring to Improve Safety of Older Persons", Feb. 2007, 6 Pages.

Stauffer et al. "Learning patterns of activity using real-time tracking", IEEE Transactions on Pattern Analysis and Machine Intelligence, vol. 22, No. 8, Aug. 2000, 17 Pages.

IN Application No. 201811042193 Examination Report dated Oct. 5, 2021, 6 pages.

* cited by examiner

CONVEYANCE SYSTEM VIDEO ANALYTICS

CROSS-REFERENCE TO RELATED APPLICATIONS

This application claims the benefit of the IN Application No. 201811042193 filed Nov. 9, 2018, which is incorporated herein by reference in its entirety.

BACKGROUND

The embodiments herein relate to conveyance system operation and more particularly to conveyance system video analytics.

Conveyance systems, such as elevator systems, may be linked to video surveillance systems that stream video from one or more cameras from a location local to the conveyance system to a centralized surveillance station. Surveillance system operators may monitor the video feeds to determine whether abnormal conditions are present at one or more conveyance systems. In structures with multiple conveyance systems operating in parallel, the video feeds can consume a large amount of bandwidth and/or may require multiple dedicated video links. Further, it can be challenging for human observers to note more subtle changes in conditions of the conveyance systems.

SUMMARY

According to an embodiment, a method includes capturing image data from a video camera at a conveyance system. Analytics of the image data are initiated to determine a plurality of conditions of the conveyance system. A status of the conditions is summarized as a metadata output. The metadata output is transmitted to a support system operable to initiate a corrective action responsive to the status of the conditions.

In addition to one or more of the features described herein, or as an alternative, further embodiments can include where the conditions include a luminescence level of the conveyance system.

In addition to one or more of the features described herein, or as an alternative, further embodiments can include where the conditions include a status of or damage to one or more components of the conveyance system.

In addition to one or more of the features described herein, or as an alternative, further embodiments can include where the conditions include an operational status of a control operating panel of the conveyance system.

In addition to one or more of the features described herein, or as an alternative, further embodiments can include where the conditions include a state of occupancy of the conveyance system.

In addition to one or more of the features described herein, or as an alternative, further embodiments can include where the conveyance system includes a passenger enclosure, and the conditions include one or more of: door operation of the passenger enclosure and a door cycle count of the passenger enclosure.

In addition to one or more of the features described herein, or as an alternative, further embodiments can include where the conditions include entrapment of one or more occupants within the passenger enclosure.

In addition to one or more of the features described herein, or as an alternative, further embodiments can include where the conditions include vandalism, and the method includes outputting a suspected vandalism notification with an image of a suspected vandal based on the image data.

In addition to one or more of the features described herein, or as an alternative, further embodiments can include applying machine learning to identify a plurality of scenarios and using a plurality of feature images to establish one or more benchmarks.

In addition to one or more of the features described herein, or as an alternative, further embodiments can include adapting the image data for variations in arrangement of the conveyance system and lighting.

According to an embodiment, a system includes a video camera and a monitoring system operably coupled to the video camera. The monitoring system is configured to perform a plurality of operations including capturing image data from the video camera at a conveyance system and initiating analytics of the image data to determine a plurality of conditions of the conveyance system. The monitoring system is further configured to summarize a status of the conditions as a metadata output and transmit the metadata output to a support system operable to initiate a corrective action responsive to the status of the conditions.

Technical effects of embodiments of the present disclosure include performing video analytics to determine one or more conditions within an elevator car.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
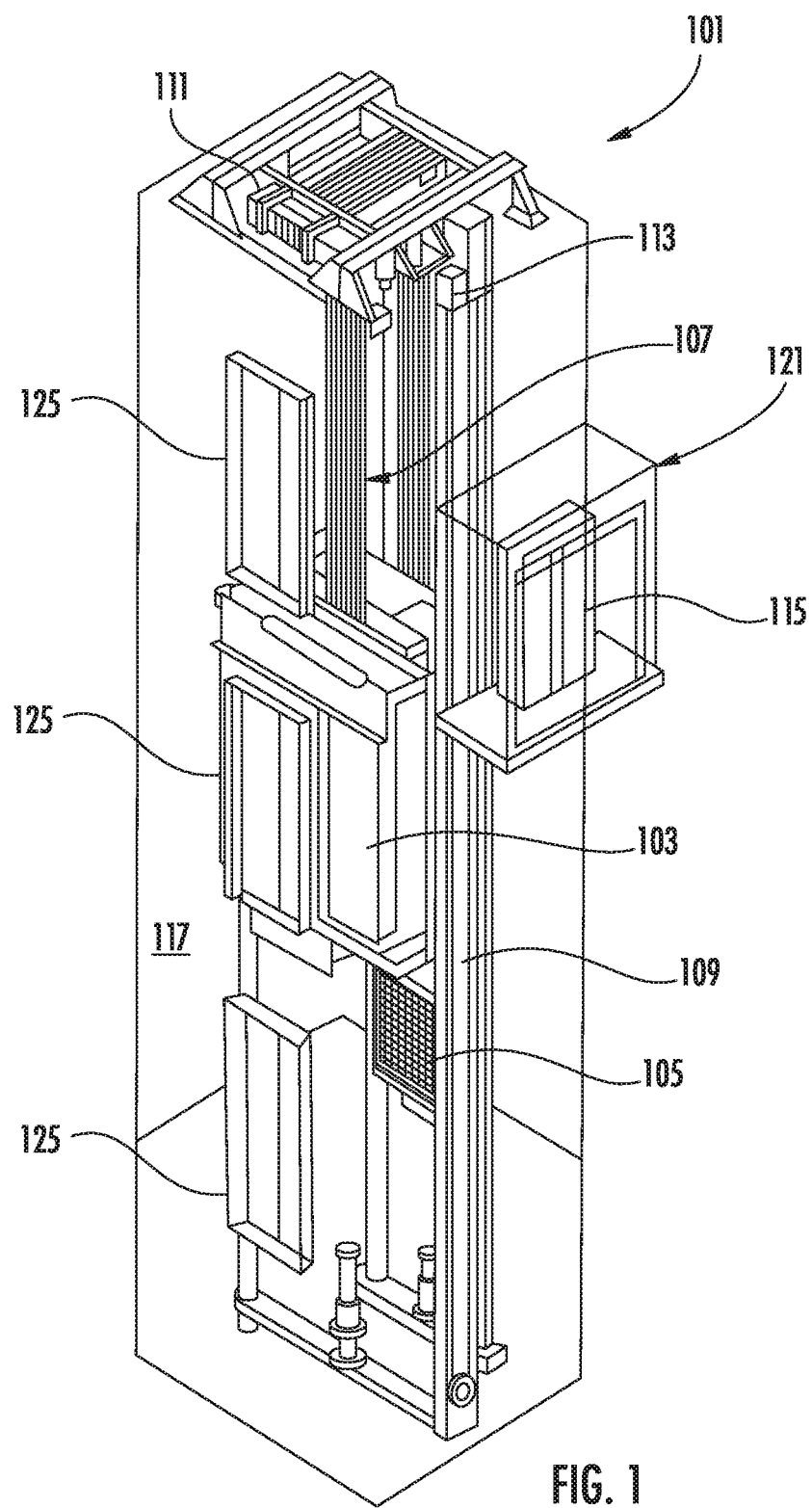
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. Thus, the elevator system 101 may also be referred to as conveyance system 101.

Figure 2:
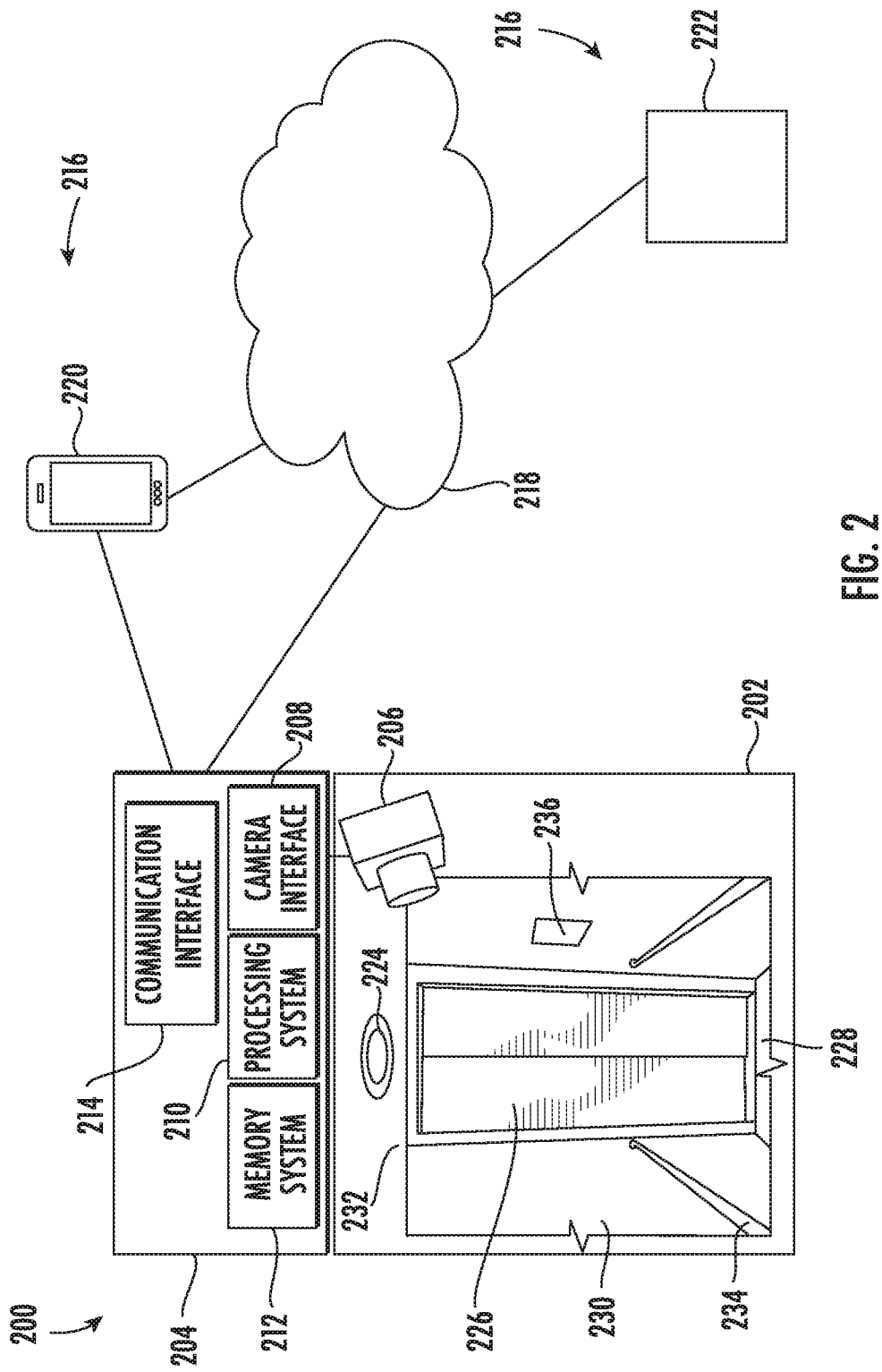
FIG. 2 is a block diagram of a system that may employ various embodiments of the present disclosure.

FIG. 2 depicts an example of a system 200 according to an embodiment. The system 200 includes a passenger enclosure 202, which may be the elevator car 103 of FIG. 1. The system 200 also includes a monitoring system 204 operably coupled to a video camera 206, where the video camera 206 is configured to capture image data at a conveyance system, such as conveyance system 101 of FIG. 1. In the example of FIG. 2, there is a single instance of the video camera 206 within the passenger enclosure 202. In alternate embodiments, there may be multiple instances of the video camera 206, for instance, to capture multiple angles within the passenger enclosure 202, to perform depth measurements (e.g., in a stereoscopic configuration), and/or to observe for interior and exterior conditions relative to the passenger enclosure 202. Embodiments with a single instance of the video camera 206 may be beneficial for applications (e.g., retrofit applications) where a lower complexity solution is sufficient to capture images of conditions of interest. Rather than integrating a large suite of sensors to determine various conditions within the passenger enclosure 202, the monitoring system 204 can be configured to capture image data through a camera interface 208 and initiate analytics of the image data to determine a plurality of conditions of the conveyance system 101. Although FIG. 2 depicts the video camera 206 at an angle, the location and orientation of the video camera 206 can vary depending upon camera type, installation geometry, and types of events or conditions to be captured. For instance, the video camera 206 may be mounted in a central location in the ceiling of the elevator car 103, looking downwards. The monitoring system 204 can also include a processing system 210, a memory system 212, and a communication interface 214, as well as other subsystems (not depicted). In some embodiments, the processing system 210 is configured to capture image data and perform on-board image processing to analyze the content of the image data. In other embodiments, the processing system 210 provides captured image data through the communication interface 214 for off-board image processing, such as image processing performed at the controller 115 of FIG. 1, or another location, such as cloud-based image processing through a network 218 and/or other computing resources.

The processing system 210 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory system 212 may be a storage device such as, for example, a random access memory (RAM), read only memory (ROM), or other electronic, optical, magnetic or any other computer readable storage medium. The memory system 212 can include computer-executable instructions that, when executed by the processing system 210, cause the processing system 210 to perform operations as further described herein.

The communication interface 214 can include wired, wireless, and/or optical communication links to establish communication with one or more support systems 216 either directly or through the network 218. Examples of the support systems 216 can include a mobile device 220 or any type of computer system 222, such as a personal computer, a workstation, a laptop computer, a tablet computer, wearable computer, or a custom-built computer system, and/or the controller 115 of FIG. 1. The mobile device 220 may have a service interface for a mechanic or technician to further diagnose data associated with one or more conditions reported by the monitoring system 204. The computer system 222 may be a central control computer that monitors the functionality of multiple instances of the conveyance system 101, such as multiple elevators in the same building or structure. The computer system 222 may also or alternatively be part of a security system that monitors for safety conditions and/or potential damage to the passenger enclosure 202. The computer system 222 may also be part of an elevator service system to monitor and control conditions pertaining to the elevator system 101. The network 218 can also support cloud-based operations and processing to directly support or partially offload processing burdens of the processing system 210.

In some embodiments, the support systems 216 can control one or more aspects of the passenger enclosure 202 as part of a corrective action responsive to the status of the conditions as reported by the monitoring system 204. For example, if a luminescence level of one or more light fixtures 224 of the passenger enclosure 202 is reported below a minimum lighting threshold, the support systems 216 may disable operation of the passenger enclosure 202 until the light fixtures 224 can be repaired or otherwise serviced. The monitoring system 204 may observe an average luminescence level in the image data captured by the video camera 206 and monitor for changes over time. Where the interior of the passenger enclosure 202 is configured to receive exterior lighting, e.g., through windows, the time-of-day and/or external weather conditions may be considered in making health determinations with respect to the light fixtures 224. Further, an opened/closed state of one or more doors 226 of the passenger enclosure 202 may also be considered in determining the luminescence level.

The embedded video analytics of the monitoring system 204 can monitor for various observable conditions of the passenger enclosure 202. For instance, the monitoring system 204 can detect features such as a floor 228, walls 230, ceiling 232, rails 234, and a control operating panel 236. By observing for changes occurring over time, the accumulation of dirt, debris, or damage may be detected through the image data. The image processing of the monitoring system 204 can include applying machine learning to identify a plurality of scenarios and using a plurality of feature images to establish one or more benchmarks. The image processing can also include adapting the image data for variations in arrangement of the conveyance system and lighting. For example, the monitoring system 204 may perform initial training by accessing a library of feature data locally within the memory system 212 or remotely over the network 218 to learn relative positions, sizing, color, illumination levels, and other features that define the light fixtures 224, doors 226, floor 228, walls 230, ceiling 232, rails 234, control operating panel 236, and the like. Algorithms such as edge detectors, classifiers, and known machine learning techniques (e.g., linear regression, nearest neighbors, support vector machines, neural networks, and the like) can be implemented locally at the monitoring system 204 to establish benchmarks and observe variations from the benchmarks. Thus, different configurations of the passenger enclosure 202 and changes over time can be detected. The monitoring system 204 can distinguish, for instance, between the accumulation of dirt or debris that accumulates over time on one or more surfaces of the passenger enclosure 202 and the hanging of a sign or picture within the passenger enclosure 202. Further, by distinguishing between various surfaces within the passenger enclosure 202, the existence of a condition in need of a corrective action response can be determined. For instance, a change in shape, linearity, angular deflection, or other aspects of the rails 234 can be indicative of damage to the rails 234 that result in a service call. Some conditions may include a combination or time-based sequence to be established. For instance, a movement pattern of the doors 226 may include observing a sequence of multiple frames of image data to verify proper operation in terms of complete opening/closing, rate of travel, and the like. The algorithm can also be trained to count door open/door close cycles leading to improved door service. Illumination of or damage to the control operating panel 236 may also take multiple frames of image data to confirm.

Further, the monitoring system 204 can observe occupancy and activity of occupants within the passenger enclosure 202. For instance, the monitoring system 204 can use known passenger counting techniques to track a number of occupants entering and exiting the passenger enclosure 202. Occupant entrapment may be detected where the one or more occupants remain within the passenger enclosure 202 and the doors 226 do not open after a predetermined timeout period. Other approaches to tracking and entrapment detection are contemplated. Further, the monitoring system 204 may support real-time detection of vandalism within the passenger enclosure 202 by one or more occupants. Upon detecting at least one occupant and a change in one or more surface features, such as dents, scratches, paint, holes, broken buttons or ill-functioned lights around the buttons, and the like, the monitoring system 204 can incorporate a potential vandalism condition message in a notification to the one or more support systems 216. Images of conditions and/or of a suspected vandal can be captured in image data and reported.

Figure 3:
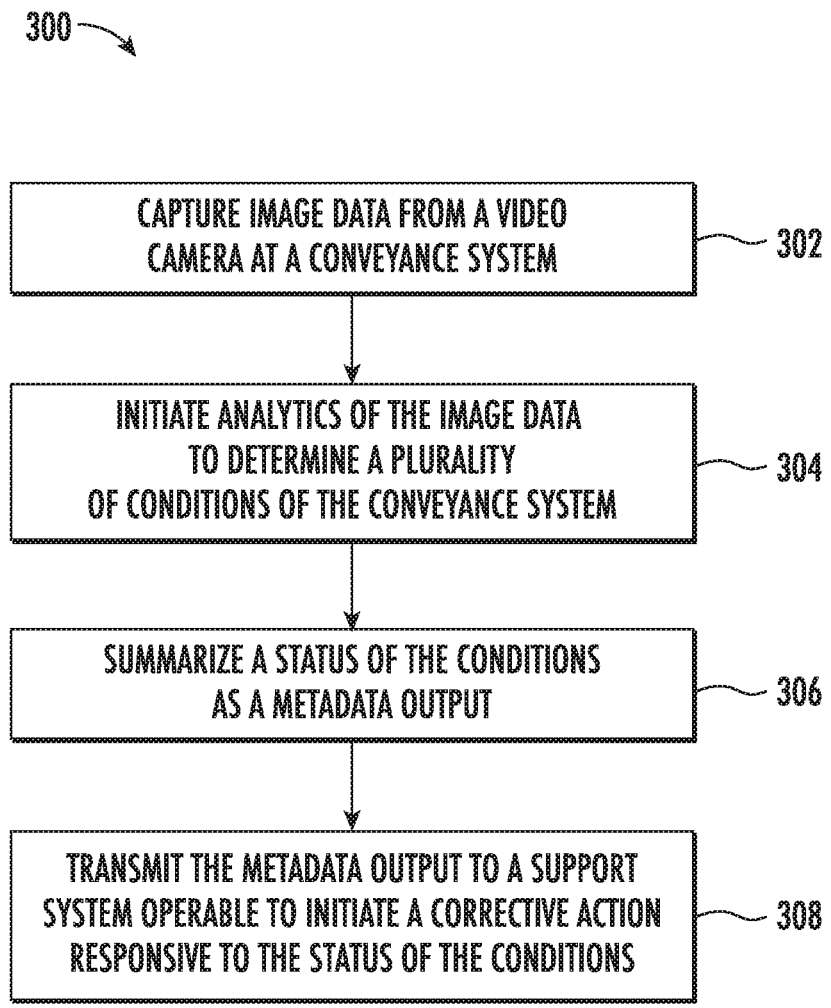
FIG. 3 is a flow diagram illustrating a process, according to an embodiment of the present disclosure.

Referring now to FIG. 3 with continued reference to FIGS. 1-2, FIG. 3 depicts a flow chart of a method 300 in accordance with an embodiment of the disclosure. The method 300 can be performed, for example, by the monitoring system 204 of FIG. 2.

At block 302, the monitoring system 204 captures image data from a video camera 206 at a conveyance system 101. As previously described, the video camera 206 can be mounted within the passenger enclosure 202. The monitoring system 204 can be local to the passenger enclosure 202 and may travel with the passenger enclosure 202.

At block 304, the monitoring system 204 can initiate analytics of the image data to determine a plurality of conditions of the conveyance system 101. Examples of conditions with respect to an elevator are further described with respect to FIG. 4.

At block 306, the monitoring system 204 can summarize a status of the conditions as a metadata output. Rather than storing all of the image data, the metadata output can summarize observed conditions from the image data. Further, image data may be temporarily buffered in the memory system 212, with clips or sequences captured and retained around events or conditions of interest. This can reduce the storage requirements of the memory system 212 and the communication bandwidth requirements of the network 218.

At block 308, the monitoring system 204 can transmit the metadata output to a support system 216 operable to initiate a corrective action responsive to the status of the conditions. Transmission of data and/or metadata output can include sending data to the controller 115 to perform one or more corrective actions and/or further analysis. Corrective actions can include disabling or removing the passenger enclosure 202 from service, changing scheduling of other conveyance systems 101, sending the elevator car 103 to a certain floor, stopping movement of the elevator car 103, triggering a security alert, initiating a maintenance request, initiating communication with occupants of the passenger enclosure 202, and other such actions.

While the above description has described the flow process of FIG. 3 in a particular order, it should be appreciated that unless otherwise specifically required in the attached claims that the ordering of the steps may be varied.

Figure 4:
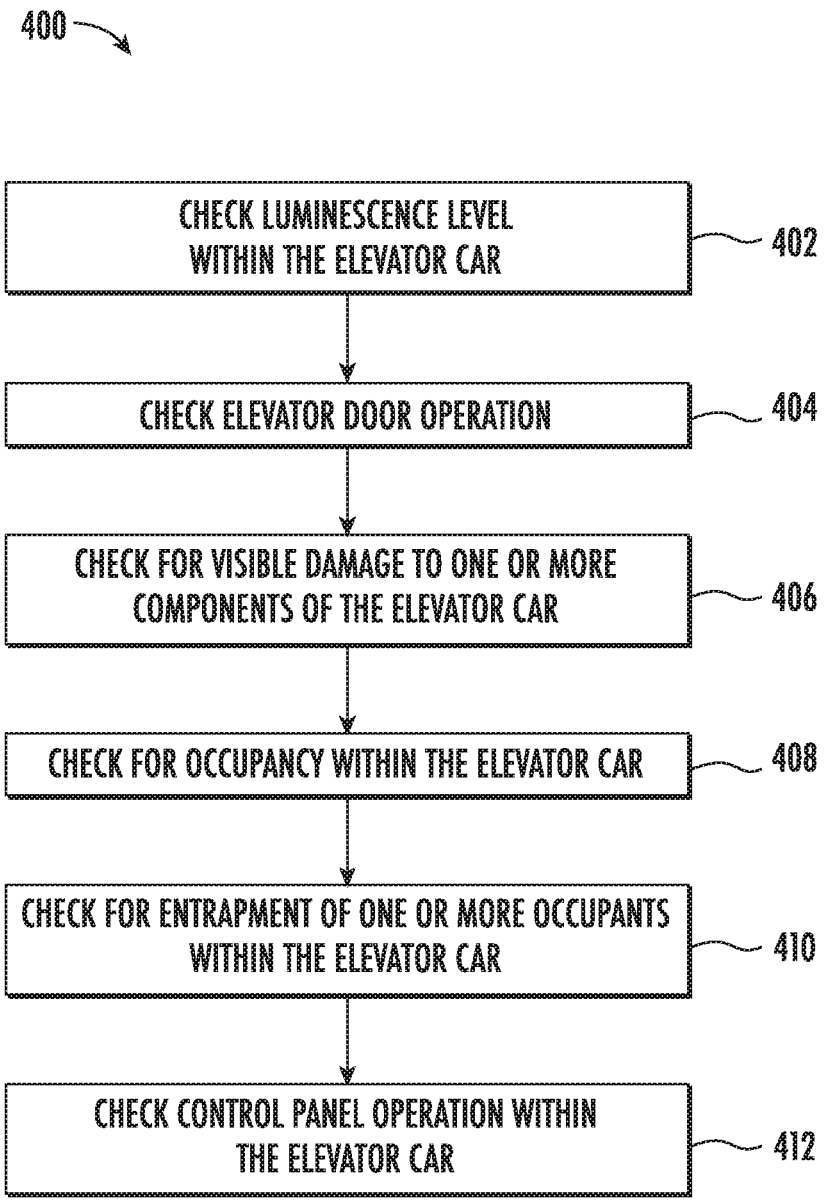
FIG. 4 is a flow diagram illustrating a process, according to an embodiment of the present disclosure.

Referring now to FIG. 4 with continued reference to FIGS. 1-3, FIG. 4 depicts a flow chart of a method 400 of condition checks of the conveyance system 101, where implemented as elevator system 101 in accordance with an embodiment of the disclosure. The method 400 can be performed, for example, by monitoring system 204 (e.g., processing system 210) of FIG. 2. The sequence depicted in FIG. 4 is not intended to convey a particular sequence of steps, which may be re-ordered, with other steps added, omitted, or combined. For instance, blocks depicted of the method 400 of FIG. 4 may be executed based on various scheduling, conditions, and/or events, such as when the elevator car 103 is stopped, timing conditions are met, etc.

At block 402, the monitoring system 204 can check a luminescence level of the conveyance system 101, for instance, based on image brightness data of image data from the video camera 206. As one example, in a Red-Green-Blue (RGB) color space, RGB pixels can be averaged across an image and masking may be used to block out selected features when determining a luminescence level. Luminescence level checks can include establishing reference levels, tracking light bulb/fixture aging, normalizing for outside lighting effects, coordinating with door opened/closed status, and the like. Training with reference images can be used to establish reference levels and initial conditions.

At block 404, the monitoring system 204 can check door 226 operation of the passenger enclosure 202. Image data can be analyzed over time to ensure that the doors 226 are not stuck and can open and close smoothly. Door operation checks can also capture image data while the doors 226 are open to inspect for dirt, debris, or obstructions that are not otherwise visible when the doors 226 are closed. Visual inspection of the doors 226 may be performed each time that the doors 226 cycle between opened and closed when not otherwise visually obstructed.

At block 406, the monitoring system 204 can check for a status or visible damage to one or more components of the conveyance system 101, such as floor 228, walls 230, ceiling 232, rails 234, and the control operating panel 236 of the passenger enclosure 202 using image data. The status can include state data, such as confirming a current opened/closed state of the doors 226, inspecting for dirt, and/or various types of damage, such as scratches, dents, defacement, and the like.

At block 408, the monitoring system 204 can check for occupancy of the conveyance system 101, such as determining whether or how many people are observed within the passenger enclosure 202 based on the image data. The check for occupancy can also include checking a condition of occupancy, such as whether someone has fallen, whether occupants are fighting, vandalism is in progress, and/or other such conditions related to occupants. Image data associated with occupancy may be captured and output, for instance, to assist in identifying a suspected vandal. General occupancy may be determined by subtracting a sequence of image frames to identify motion within the elevator car 103 while the doors 226 are closed. If motion is detected, one or more classifiers can be applied to the image data to search for facial features and/or other features of interest.

At block 410, the monitoring system 204 can check for entrapment of one or more occupants within the passenger enclosure 202 based on the image data. Entrapment can be detected, for instance, based on motion detected within the elevator car 103 and an extended period of time (e.g., a timeout period) without opening of the doors 226. Other algorithms are contemplated.

At block 412, the monitoring system 204 can check an operational status of the control operating panel 236 of the conveyance system 101 based on the image data. The operational status can include detection of button illumination, button responsiveness, button damage, and other such features.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims:

What is claimed is:

1. A method comprising:
   capturing image data from a video camera at a conveyance system, wherein the conveyance system comprises a passenger enclosure;

initiating analytics of the image data to determine a plurality of conditions of the passenger enclosure;

summarizing a status of the conditions as a metadata output; and transmitting the metadata output to a support system operable to initiate a corrective action and to control one or more aspects of the passenger enclosure as part of the corrective action responsive to the status of the conditions.

2. The method of claim 1, wherein the conditions comprise a luminescence level of the passenger enclosure.

3. The method of claim 1, wherein the conditions comprise a status of or damage to one or more components of the passenger enclosure.

4. The method of claim 1, wherein the conditions comprise an operational status of a control operating panel of the passenger enclosure.

5. The method of claim 1, wherein the conditions comprise a state of occupancy of the passenger enclosure.

6. The method of claim 1, wherein the conditions comprise one or more of: door operation of the passenger enclosure and a door cycle count of the passenger enclosure.

7. The method of claim 6, wherein the conditions comprise entrapment of one or more occupants within the passenger enclosure.

8. The method of claim 1, wherein the conditions comprise vandalism, and the method further comprises:

outputting a suspected vandalism notification with an image of a suspected vandal based on the image data.

9. The method of claim 1, further comprising:

applying machine learning to identify a plurality of scenarios and using a plurality of feature images to establish one or more benchmarks.

10. The method of claim 1, further comprising:

adapting the image data for variations in arrangement of the passenger enclosure and lighting.

11. A system comprising:

a video camera; and a monitoring system operably coupled to the video camera and configured to perform a plurality of operations comprising:

capturing image data from the video camera at a conveyance system, wherein the conveyance system comprises a passenger enclosure;

initiating analytics of the image data to determine a plurality of conditions of the passenger enclosure;

summarizing a status of the conditions as a metadata output; and transmitting the metadata output to a support system operable to initiate a corrective action and to control one or more aspects of the passenger enclosure as part of the corrective action responsive to the status of the conditions as reported by the monitoring system.

12. The system of claim 11, wherein the conditions comprise a luminescence level of the passenger enclosure.

13. The system of claim 11, wherein the conditions comprise a status of or damage to one or more components of the passenger enclosure.

14. The system of claim 11, wherein the conditions comprise an operational status of a control operating panel of the passenger enclosure.

15. The system of claim 11, wherein the conditions comprise a state of occupancy of the passenger enclosure.

16. The system of claim 11, wherein the conditions comprise one or more of: door operation of the passenger enclosure and a door cycle count of the passenger enclosure.

17. The system of claim 16, wherein the conditions comprise entrapment of one or more occupants within the passenger enclosure.

18. The system of claim 11, wherein the monitoring system is further configured to perform:

outputting a suspected vandalism notification with an image of a suspected vandal based on the image data.

19. The system of claim 11, wherein the monitoring system is further configured to perform:

applying machine learning to identify a plurality of scenarios and using a plurality of feature images to establish one or more benchmarks.

20. The system of claim 11, wherein the monitoring system is further configured to perform:

adapting the image data for variations in arrangement of the passenger enclosure and lighting.

* * * * *